(12) United States Patent
Thurot (10) Patent No.: US 7,708,965 B2
(45) Date of Patent: May 4, 2010

(54) AIR PURIFYING METHOD

(75) Inventor: Phillippe J. Thurot, Saintry (FR)

(73) Assignee: ACES Environnement, Saintry-sur-Seine (FR)

( * ) Notice: Subject to any disclaimer, the term of this patent is extended or adjusted under 35 U.S.C. 154(b) by 110 days.

(21) Appl. No.: 11/908,264

(22) PCT Filed: Nov. 28, 2005

(86) PCT No.: PCT/FR2005/002948

§ 371 (c)(1),
(2), (4) Date: Sep. 10, 2007

(87) PCT Pub. No.: WO2006/058988

PCT Pub. Date: Jun. 8, 2006

(65) Prior Publication Data

US 2008/0216535 A1   Sep. 11, 2008

(30) Foreign Application Priority Data

Nov. 30, 2004  (FR) ................................. 04 12698

(51) Int. Cl.
*A61L 2/00*   (2006.01)
*A61L 9/00*   (2006.01)
*B01D 53/34*   (2006.01)
*C12M 1/00*   (2006.01)
*C12M 1/12*   (2006.01)

(52) U.S. Cl. ................ 423/210; 423/DIG. 17; 422/4; 422/5; 422/28; 435/290.1; 435/290.4; 435/262; 435/264; 435/266

(58) Field of Classification Search ............... 423/210, 423/DIG. 17; 422/4, 5, 28; 435/290.1, 290.4, 435/262, 264, 266
See application file for complete search history.

(56) References Cited

U.S. PATENT DOCUMENTS

| | | | |
|---|---|---|---|
| 4,410,349 A | | 10/1983 | Laurenson, Jr. et al. |
| 5,153,137 A | | 10/1992 | Laurenson, Jr. et al. |
| 5,503,738 A | * | 4/1996 | DeFilippi et al. ............ 210/150 |
| 6,087,159 A | * | 7/2000 | Finn ......................... 435/299.1 |
| 6,099,613 A | | 8/2000 | Allen et al. |
| 6,100,081 A | * | 8/2000 | Buelna ......................... 435/266 |
| 2003/0022364 A1 | * | 1/2003 | Parent et al. .............. 435/296.1 |
| 2004/0082060 A1 | | 4/2004 | Allen |
| 2004/0152185 A1 | * | 8/2004 | Egan et al. ................... 435/266 |
| 2004/0175818 A1 | * | 9/2004 | Kozliak et al. ............... 435/262 |
| 2006/0057711 A1 | * | 3/2006 | Timm et al. ............... 435/290.1 |
| 2006/0107714 A1 | * | 5/2006 | Wadewitz ......................... 71/8 |
| 2006/0188980 A1 | * | 8/2006 | Holtzapple et al. ........ 435/290.1 |
| 2006/0246579 A1 | | 11/2006 | Thurot |

FOREIGN PATENT DOCUMENTS

FR   2 839 305   11/2003

OTHER PUBLICATIONS

International Search Report for PCT/FR2005/002948.

* cited by examiner

*Primary Examiner*—Timothy C Vanoy
(74) *Attorney, Agent, or Firm*—Young & Thompson (57) ABSTRACT

The invention concerns a novel method for purifying air and gasses, consisting of an optimized air ventilation slab, with its air ventilation pipes, air ventilation pipettes and air diffusion plugs; optionally a complementary cellular material enabling the material to be supported providing biofiltration, purification or treatment of air, and optionally a device for diffusing liquids and/or bacteria and/or enzymes, allowing the biofilter to act as the equivalent of a gas scrubbing tower.

10 Claims, 6 Drawing Sheets

AIR PURIFYING METHOD

CROSS REFERENCE TO RELATED APPLICATIONS

This application is a National Phase filing under 35 U.S.C. §371 of PCT/FR2005/002948 filed Nov. 28, 2005, which claims priority to French Patent Application No. 0412698, filed Nov. 30, 2004. The entire contents of each of the above-applications are incorporated herein by reference.

This present invention concerns the areas of composting, the elimination of pollution, and the treatment of waste. Its main purpose is to improve composting processes and certain other processes associated with the elimination of pollution and the treatment of waste.

It is known that composting processes on an aeration bed improve the composting process and bring about a reduction in the length of the composting process. In this context, it is traditional to consider that the composting process is accelerated by virtue of the aeration bed, and that it can be divided into three phases, namely a first phase, known as fermentation, which traditionally lasts for about four weeks, a second phase, called maturation or secondary fermentation, which lasts for six to eight weeks, and finally a phase known as refining, which can last from several weeks to several months, with a view to refining the product and its commercialisation. It should be noted that the commercialisation of composts can also take place from the end of fermentation and or from the end of the maturation period, before it has been refined.

After the fermentation phase, the compost produces is described as "fresh".

After the maturation phase, the compost produced is described as "mature".

In practice, if one wishes to produce a "mature" compost, it is necessary to leave the compost to break down on the fermentation base and then on the maturation base, which in all is at least 10 weeks or even 12 weeks or longer, and to complete the aeration of the organic waste on the fermentation base, or on both of these bases (fermentation and maturation) through the complementary turning of the waste, using a machine of the loader or spinner type, at least during the maturation period or even the fermentation period.

It is also known that, in the context of composting processes on aeration beds, composting solutions have already been developed with maximum heap heights, recommended by the process inventors, of three meters, for green waste and the fermentable waste or biowaste, and maximum heap heights of two meters to two meters fifty for composted sludges.

It is further known that composting processes have recently been improved by technological innovations concerning measurement of the gas content in composting platforms (patent PCT FR 02 00039 dated 8 Jan. 2002 and entitled "An optimised device for discontinuous regulation and measurement of the content of oxygen or any other gas, in platforms used for composting or the treatment of waste").

It is further known that other improvements have also been made to the design of the aeration beds, in particular by the design of modular devices and new clip systems for the design of aeration pipettes fitted to the main aeration pipes and installed in the aeration composting beds (patent PCT 03 01382 dated 2 May 2003 and entitled "Modulable and optimised installation for the composting of organic materials").

The composting installations of prior art, and those installed with the last two technologies mentioned above, have different drawbacks which will be described in detail below.

Turning of the compost heaps is the standard technique in the area of composting and the treatment of certain waste materials (stabilisation of the refuse, elimination of pollution from polluted soil and earth, etc.) since this allows one to ensure consistently even breakdown of the organic material and purification of the latter in depth.

The recommended height of the compost heap on an aeration bed nevertheless remains limited to three meters for green waste, biowaste and fermentable waste, and to two meters fifty for sludges. Above this, the breakdown of the organic material is poor, since it is uneven due to variability of the air passages in the heaps.

The new technology of air sampling and measurement of the oxygen content has the drawback that it favours the appearance of condensation products in the intake pipes for sampling of the gases in each heap. Over time, the gas-sampling pipe fills up with condensation products and also clogs, preventing measurement gases from being monitored. In certain waste composting applications, the air drawn in from the sampling rods inserted into each compost heap, for measurement of the oxygen, transports organic particles or fine materials in suspension, which are able to form a sticky substance in the gas measuring pipe, which can prevent operation of the solenoid valves that control sampling of the gases under investigation.

In the design of the new platforms for the composting or for the treatment of certain waste materials, the distribution of air, and therefore the associated aeration bed, becomes a central element of the process. The result is an improvement in the aeration potential and the effectiveness of the base or bed, the flows in the latter, and even the design of the aeration pipes and the aeration pipettes associated with them become an important factor. In this context, it has appeared to be useful to make improvements to the design and the industrial manufacture of the aeration pipettes associated with the aeration bed.

It has become apparent that it is possible for the pipettes to become clogged at the head of each pipette, because of the waste present on the aeration bed, when this aeration bed is incorrectly constructed. This is the case in particular when the pipette heads are located above the top screed constituting the aeration bed, and not at the level of the latter. It has also been observed that, despite the securing clips of the pipette heads, there is a risk that the aeration pipettes can easily become detached from the aeration pipes, thereby rendering the formation of the bed more difficult.

In the composting processes, in particular of sludge and biowaste, the creation of a vacuum in the waste is the rule, and the need to deal with the foul air leads to the construction in particular either of biofilters or of the scrubbing towers, to deal with the air in particular, and also, though not exclusively, to deal with gases that contain ammoniac and/or sulphurs.

Regarding the biofilters, these are often equipped with a grating to support the biomass used to process the foul air. Certain manufacturers of composting systems have replaced the support grating by a ballast of angular stones similar to those used to support of the rails of railway lines (the ballast used by SNCF, the French national railway company). The sole function of this ballast is to support and holds the biomass, and/or to position the aeration pipes for distribution of the polluted air under the biomass.

The objective of this present invention is to overcome the drawbacks mentioned above, and to improve the design and the effectiveness both of the aeration bed and, in particular, of the aeration pipettes as well as the composting processes and the treatment of certain wastes.

SUMMARY OF THE INVENTION

The purpose of this present invention is to allow the production of a "mature" compost in eight weeks of fermentation and maturation, with no turning in the fermentation and maturation phase, and with no biofilter, in particular for the composting of green waste, biowaste and fermentable waste, and with no production of bad odours.

To this end, the installation of the invention includes an aeration bed that is composed of at least four aeration lines per fan, with a separation between the aeration lines of two meters at most, for the composting of green waste, biowaste and fermentable waste, with an obligatory covering of the waste in the fermentation and maturation phase of at least twenty to thirty centimeters of purified maturing and refining compost, by means of a composting process that functions principally by positive ventilation (blowing of air into the heap under pressure, and the absence of vacuum), with a composting process that is organised in the form of tubular rather than trapezoidal heaps, with a regular separation between the aeration pipettes for distribution of the air, at the level of each (equidistant) aeration line, and therefore a separation between the aeration pipettes that does not vary regardless of the distance between the fan and the linear aeration that constitutes the aeration bed, with a distance between the aeration pipettes of the order of 20 centimeters.

This present invention has the additional objective of efficiently dealing with heights or depths of waste that are greater than those handled up to the present, while also dispensing with any turning during the phases known as fermentation and maturation, and of achieving this without the production of bad odours, and therefore with no biofilter.

In this context, the height of the waste to be composted will no longer be of the order of three meters but even four meters for green waste, biowaste and fermentable waste, and two meters sixty-five for composted sludges.

The length of each linear aeration arrangement can be at least forty meters from the composting machinery, which is at least four times forty meters per fan with a power rating of more than 5 and less than 6 kW, making a total of one hundred and sixty meters of aeration pipes per fan at this level of power.

Parallel to this, whatever the type of waste treated, consideration has been given to the design of tubular aeration pipettes which are in a single piece, fitted with securing clips, these pipettes being inserted directly on the aeration pipes.

Parallel to this, and according to another particular method of manufacture of the aeration pipettes, consideration has also been given to the production of a hollow tube directly.

According to one possible embodiment of the aeration pipette, the manufactured pipette includes a clip in its lower part. According to a second possible method for the design of the aeration pipette, the clip can include at least one notch or cut or even several notches or several cuts, in order to further improve the retention of the clip of the aeration pipette in the main air distribution pipe to which the aeration pipettes are clipped.

According to a second possible design method, complementary to the first method of design of the aeration pipette, the latter can also include a thread to enable the insertion of a plug of the threaded type, into the upper part of the aeration pipette. It is this solid, threaded plug that will then be drilled after formation of the concrete bed. The purpose of this thread is to enable the replacement of any traditional plug inserted into, or located within the pipette head.

In the context of the aeration pipette with threading of it upper part, it is intended that the depth of the thread in the pipette head should be exactly equal to the thickness of the threaded plug. The firsts drilling tests on the threaded plugs showed in fact that when the thread of the aeration pipette has a thread depth that is greater than the thickness of the threaded plug, then during the drilling out of the threaded plug, the latter is pushed into the pipette head. This pushing inward of the threaded plug then obliges the operator to re-screw and re-position all the aeration plugs that have been pushed into the aeration pipette head, level with the top part of the concrete screed, and this very constraining.

Usually, the bed is formed at the level of the heads of aeration pipettes in order to avoid the clogging problems associated with the processing of the waste. In fact, when the plug is positioned level with the concrete bed, the air pressure is easily able to expel any pieces of sludge and fine particles clogging the air distribution holes of the aeration pipettes.

Normally, the formation of the concrete over large areas cannot ensure that all of the pipette heads will be positioned level with the concrete screed. They can therefore be buried several millimeters or even some centimeters under the concrete. The pipette heads must then be uncovered so that they can be drilled out. This then creates a space of a few millimeters or centimeters forming a volume between the top level of the concrete screed and the buried aeration pipette head. During the operation of the platform, this space fills up with sludge or fine particles, resulting in plugging of the buried aeration pipette head. The aeration pipette then becomes unfit for its purpose. In order to remedy this situation, a new type of threaded plug has been designed that allows errors due to formation of the concrete to be corrected.

Likewise, for the aeration beds intended for use in the design of biofilters, another type of threaded plug has been considered, in which the shape of the top part is raised in relation to the concrete screed, and whose shape is more particularly sloped or even rounded or conical, thus avoiding the risk of clogging of the pipettes in the long term, associated with the breakdown over time of the organic biomass.

According one particular method of design of these threaded plugs, they are manufactured from a threaded rod of greater length that the threaded original plug inserted in the pipette head. The threaded rod is directly cut to the correct height so that the resulting aeration plug will be positioned level with the concrete screed. This positioning of the threaded plug eliminates the risk of later clogging. The plug, level with the concrete screed, is then drilled to allow distribution of the air. In a second possible method for the design of the threaded plugs, they can include a reaming or hollowing out at the lower end of the plug, of larger diameter than the air distribution hole (in the internal position of the pipette), thus reducing the thickness of the plug, between the air distribution chamber created for the tube of the aeration pipette and the top part of the plug in contact with the waste.

The purpose of this reduction in the thickness of the plugs is to improve the effectiveness of the expulsion of any pieces of organic particles or sludges that may have plugged the holes in the said aeration pipettes.

In parallel with the above, another innovation has been introduced for monitoring the processing in platforms for the composting and treatment of waste. This involves installing, on the devices for regulation and measurement of the gases, and in particular for measurement of oxygen or any other gas, a filter for trapping of the dampness and of the particles drawn in by the intake pump of the measurement and air-sampling device. This filter is installed at the level of each of the intake pipes of the air drawn into in each heap, at the position where the air is sampled for the said gas measurement. The result is pipes that are clean and free of condensation products, and which are fit for reliable measurement the gases to be analysed.

Again in parallel with the above, it is also planned to install, in addition to the gas measurement device, a compressor for the production of compressed air. The purpose of this compressor is to regularly purge the condensation products present in the pipes used to transport the air drawn in by the air pump, toward the probes for measurement of the gases analysed. The transmission of air in the gas measurement and sampling pipes is controlled by a solenoid valve which is timed or controlled by the automatic process control system. The compressor can take the place of filters installed on the pipes for analysis of the gas or gases.

According to one possible method for installation of the waste composting or treatment process, which combines the compressor and the trapping filters (using a number of filters that is determined according to the number of heaps in which gas analysis is effected), short-circuiting of the filter installed on the gas sampling or analysis piping is effected using an additional pipe installed as a bypass to the pipe feeding the filter, for each filter installed. Each of these additional pipes, installed as bypasses, is equipped with a non-return valve, so that the air blown in by the compressor is able to escape and not be blocked or impeded by the installed filter. This filter is intended to operate in the direction opposite to the direction of transmission of the air supplied periodically by the compressor. The compressor sends the air from the compressor toward the compost heap in order to purge the pipe of sampling air. On the other hand, the gas measurement pump draws in the air coming from each heap, which it draws toward itself and then transmits to the probes, which it supplies with air. This drawn-in air therefore moves in the reverse direction to that sent by the compressor.

In parallel with the above, the inventors have also discovered that in those composting platforms fitted with biofilters, it is possible and more economic to dispense with the gratings traditionally employed to support the biomass, and to replace them with ballast. In this context, the manufacturers of platforms traditionally use very economical ballasts that are composed of crushed and angular stones such as those used to limit vibration of the rails during the passage of the trains (the ballast used on railway lines).

The inventors have discovered that it is advantageous to use not a ballast of crushed and angular stones but rather special ballasts composed of cobblestones (meaning ballast composed of stones that are rolled, blunted and of generally rounded shape such as those that are produced in some fast-running rivers or at the seaside).

In this context, the inventors have discovered that the cobblestones result in a better distribution of the air in the biofilter, since they form a perfectly cellular structure, in contrast to the angular stones. These cobblestones thus provide the right conditions for correct distribution of the foul air under the biomass. The inventors have also demonstrated that this ballast of cobblestones also behaves as the equivalent of the structures that are currently installed within scrubbing towers.

In fact, the ballasts composed of cobblestones favour the fixing of the bacteria in a manner that is similar to the cellular structures placed in the said scrubbing towers.

Moreover, on contact with the damp air, the ballast of cobblestones also favours condensation of the vapour in the said ballast, and converts it to water.

The condensation of the vapour into water limits or even stops the distribution of these vapours outside the biofilter. It should be remembered in particular that part of the bad odours is located in contact with the water molecules. Part of these bad odours can therefore be transported by this condensation water which will be trapped and run off into the ballast of cobblestones rather than escaping to the exterior.

Moreover, if the damp air carried in the cobblestone ballast is acid, then the resulting acid water then flowing in the ballast can also be compared to the equivalent of a conventional scrubbing process of the type employed in a so-called acid scrubbing tower. The advantage of the ballast is then that it improves the treatment of the air and allows an improved reduction of certain malodorous molecules, and in particular in air that is loaded with ammoniac.

The results regarding the purification of the air in biofilters that are made up using cobblestone ballast are therefore superior to those obtained in the case of biofilters constructed with gratings or simply using a ballast of the type used for the construction of railway track (ballast of angular stones).

Advantageously, according to another possible method for the design of the biofilter with cobblestone ballast, a device for the distribution of liquids, either of the acids or alkaline type, can also be installed above the cobblestone ballast, directly between the top part of the cobblestones and the biomass or in the biomass itself, or directly on the biomass above the biofilter. This device, combined with the cobblestone ballast, then allows distribution of the liquid, whether acid or alkaline, or combined with a cocktail of enzymes or bacteria, according to the type of air to be treated, and thus improves the reduction of the bad odours.

In addition to the traditional purification function of the biofilter, this device can thus be used to achieve a second purification function of the air to be purified. The biofilter then behaves as an improved biofilter by virtue of the cobblestone ballast. It also behaves like a simplified, though quite functional, scrubbing tower. The biofilter thus has a double purification function, namely original and new.

Other characteristics and advantages of the invention will emerge more clearly from the description that follows, and which is provided by way of an unlimited guide, with reference to the appended figures, in which:

DETAILED DESCRIPTION OF THE INVENTION

The descriptions that follow refer to FIGS. 1 to 21, which represent the new devices and new techniques associated with the composting or the treatment of waste, according to the different preferred, though not exclusive, embodiments of the invention.

Figure 1:
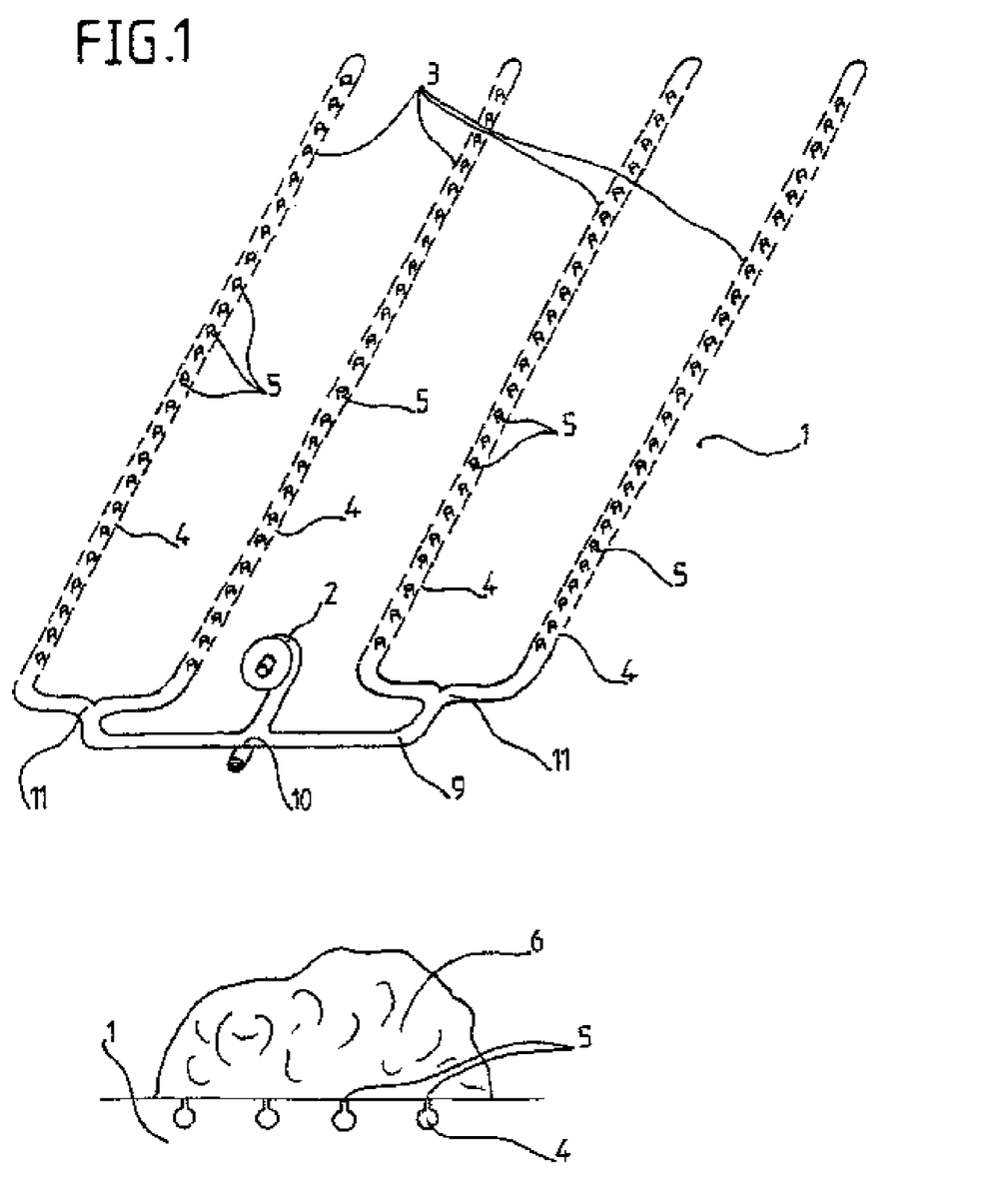
FIG. 1 is a view in perspective of a compost heap composed of four aeration lines fed by a fan.

The installation includes an aeration bed (1) composed of one or more fans (2). Each fan (2) performs the distribution of air in the aeration bed (1) via a minimum of four aeration lines (3) per fan (2). Each aeration line (3) is equipped with main aeration pipes (4) into which are inserted the aeration pipettes (5) for the distribution of air. The aeration pipettes (5) are spaced at intervals of about 20 centimeters, all along the main aeration lines (4). The separation between each of the main aeration lines (4) is two meters at most. The heaps of waste (6), made up in a tubular (7) and not trapezoidal manner, are progressively covered during the filling and creation of the fermentation heaps, consisting of twenty to thirty centimeters of purified maturation or refining compost (8). The composting process is monitored by measuring the temperature, and also by measuring the oxygen in the heap. Each main aeration pipe (4) can distribute the air up to a distance of 40 meters, giving a cumulative total length of 160 meters at most, by means of fans (2). The fan assemblies (2) are of the high power variety, with a consumed power per fan (2) of between 5 and 6 kW. The height of the waste that can be composted can easily reach 4 meters. The effectiveness of the aeration system associated with the aeration bed (1) is such that the waste can be composted with no turning during a period of eight weeks, during which they are left on the aeration bed (1), during which the process control means that the heap can be supplied continuously with oxygen, and so that the waste remains in an environment that is totally aerobic, while never allowing the level of oxygen measured in the waste to fall below a rate of 8% in comparison with the quantity of 21% of oxygen present in the air, this reduced level of 8% oxygen being due to the consumption of oxygen by the bacteria present in the waste, in the course of the fermentation and/or maturation phase. This process allows the production of a mature compost (by reference to the Solvita test) by the end of this eight-week period, compared to the usual twelve weeks. It is a process that requires no turning, is free of odour, and does not require the use of tarpaulins to cover the waste. The main air distribution pipes (4) are a minimum of 160 mm in diameter. The bends in the pipes (9) associated with the fans (2) for distribution of the air are of large turning radius, of the 5D type, in order to limit the pressure drops. The first manifold (10) for distribution of the air leaving the fan (2) allows a balanced distribution of the air, with 50% of the air volume sent to each of the two secondary pipes dividing the air between the two secondary manifolds (11). The two secondary air distribution manifolds (11) also effect a 50-50 split between the four main aeration pipes (4) for distribution of the air under the aeration bed (1). The process concerned preferably functions by blowing under pressure so as to allow maximum aeration effectiveness to be achieved. The process also functions as a "pressure chamber", guaranteeing the same pressure and the same quantity of air distributed at the level of each aeration pipette (5), to each point of the compost heap (6). All the parameters associated with breakdown of the waste within the heap (6) are thus virtually the same, namely the same degree of maturation and therefore the same temperature of the compost produced at any given moment for the similar mixtures of waste made up into heaps (6).

Figure 2:
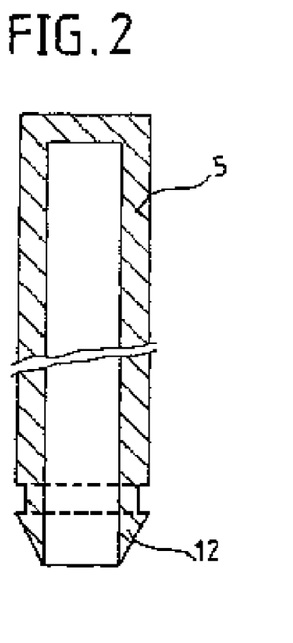
FIG. 2 is an exploded view in section of an aeration pipette manufactured as a single part.

According to one particular embodiment of the invention represented by FIG. 2, the main aeration pipes (4) can be equipped with aeration pipettes (5) produced as a single part. This single part includes a clip (12) and a plug (13) to provide for the sealing of the aeration pipe during the formation of the aeration bed (1).

According to this particular embodiment, the aeration pipette (5) can be mass produced by a process involving the injection of plastic materials in a mould.

Figure 3:
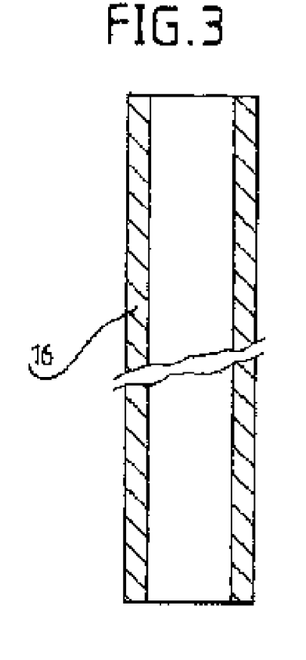
FIG. 3 is an exploded view in section of a tube to be used in the manufacture of a manufactured aeration pipette.

According to a second particular embodiment of the aeration pipettes (5), the latter can be manufactured from a simple hollow tube (16), as shown in FIG. 3. This tube (16) should preferably be in a plastic material and easy to work.

Figure 4:
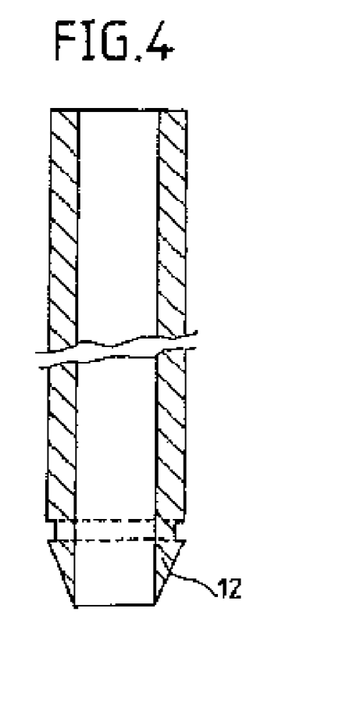
FIG. 4 is an exploded view in section of an aeration pipette with no thread in its top part but fitted with a clip.

The tube (16) can be also be manufactured from other suitable materials such as resin or glass fibre though not excluding others. The tube (16) can be processed so as to allow the formation, in its lower part, of a clip (12) as represented in FIG. 4.

Figure 5:
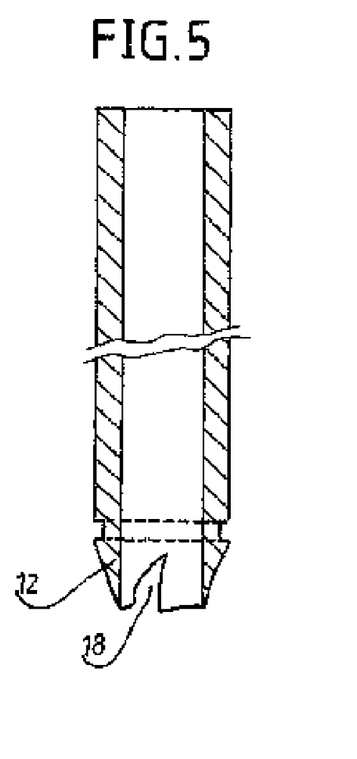
FIG. 5 is a detailed view, exploded and in section, of at least one notch created in the clip of the aeration pipette.

According to a variant of implementation of the clip, as represented in FIG. 5, the clip (12) can be equipped with at least one longitudinal notch or cut (18), allowing better latching of the clip (12) onto the main aeration pipe (4).

Figure 6:
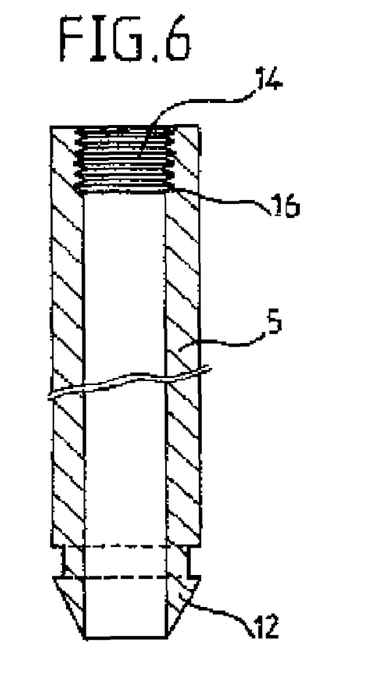
FIG. 6 is an exploded view in section of an aeration pipette that also has a thread in its top part.

According to a variant of implementation of the aeration pipette (5), as represented in FIG. 6, the latter can be machined both at its lower part and upper part, so as to allow it to be fitted with both a clip (12) and a thread (14) to allow the later insertion of a threaded plug (15) into its upper threaded part.

Figure 7:
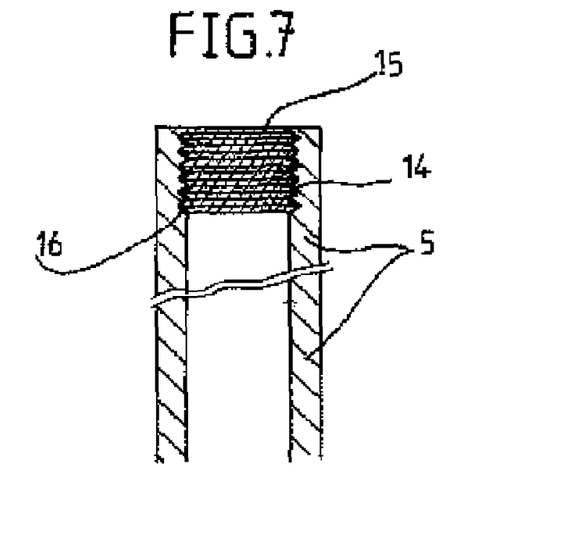
FIG. 7 is an exploded view in section and in detail of the top part of the pipette head, and of a threaded plug of the same size as the thread in the pipette head.

In this context, the thread created (14) will be located inside the tube (16). According to a preferred a embodiment of the invention, as represented in FIG. 7, and in order to avoid the unscrewing of the threaded plug (15) screwed into the top part of the head of the aeration pipette (5), during the drilling out of the threaded plug (15), before the platform is brought into service, the thickness of the internal thread (14) of the aeration pipette (5), will be equal to the thickness of the threaded plug (15) inserted into the head of the aeration pipette (5).

According to a preferred embodiment of the threaded plug (15), the latter will be manufactured from a solid tube which is then machined for creation of the internal thread, or even from a full rod which is directly threaded and cut to the desired length.

Figure 8:
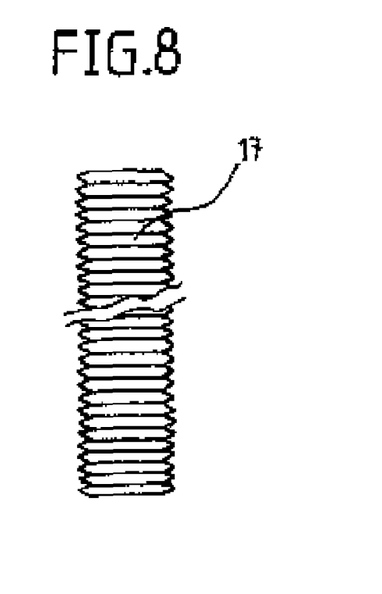
FIG. 8 presents, in section, a threaded rod for the manufacture of threaded plugs, used for correction purposes in the formation of the compost bed.
Figure 9:
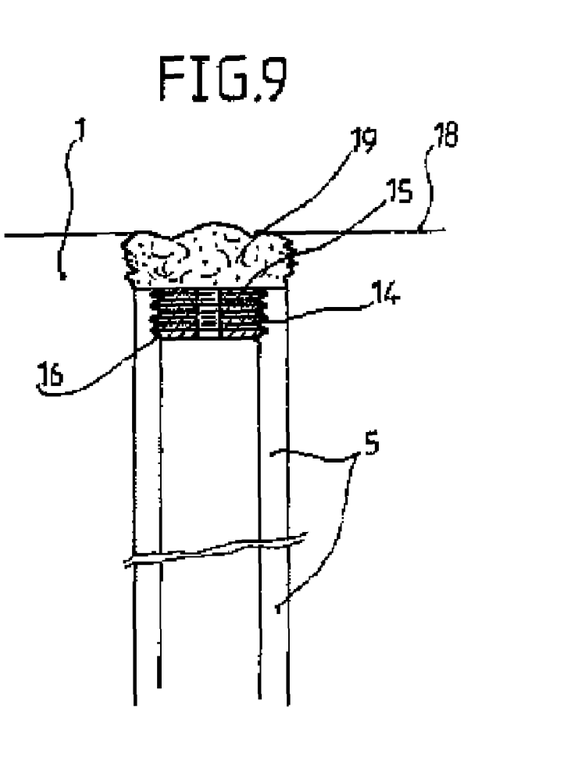
FIG. 9 presents, in section, the drawback of a pipette head that has become submerged into the concrete, and the space above it which has been filled in with sludge or fine particles, thus blocking the air distribution aperture.

According to one particular embodiment of a special plug (17), as represented in FIG. 8, where this plug is used to correct the errors that arise during the formation of the aeration bed (1). The special threaded plug (17) will then be of a size that is greater than the thickness of the thread (14) created in the head of the aeration pipette (5) so that the new pipette head can be positioned level with the concrete screed (18), thus eliminating the problem created by clogging of the pipette heads (19) when the latter have sunk below the concrete screed (18).

Figures 10, 11, 13, 14:
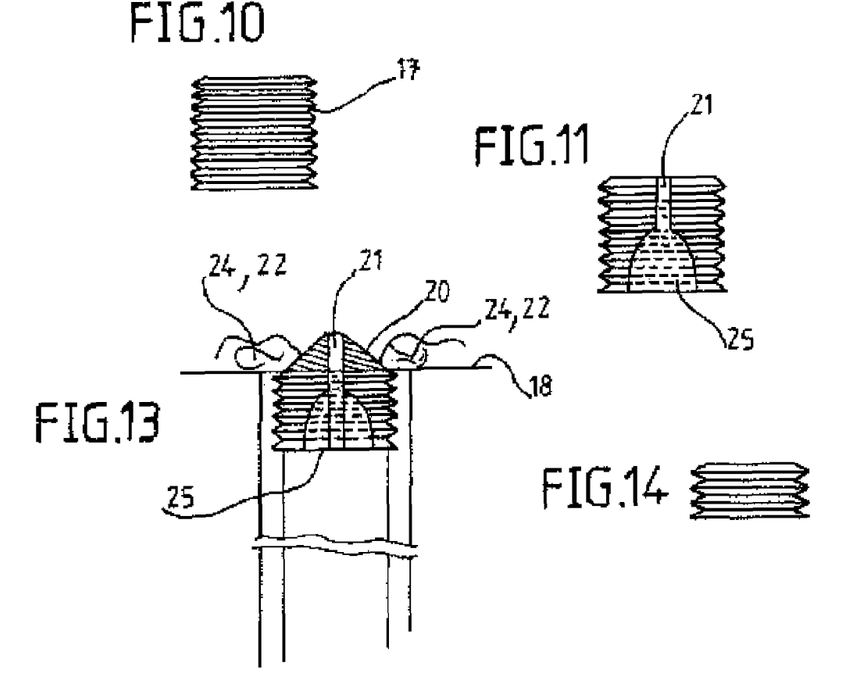
FIG. 10 is a view in section of a special threaded plug used to correct the error in the formation of the bed and to position the top part of the plug level with the concrete screed.
FIG. 11 is a view in section of a threaded plug, drilled and reamed out on the inside, to improve the effectiveness of removal of the pieces of sludge.
FIG. 13 presents this same plug, drilled and with its bottom hollowed out, allowing the risk of clogging of the special biofilter plug to be reduced.
FIGS. 14, 15 and 16 present these same plugs in section, before they have been drilled out.
Figure 12:
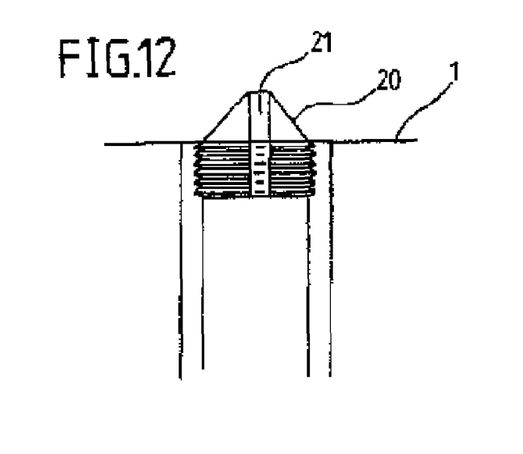
FIG. 12 presents a special threaded plug, specially drilled and designed for the distribution of air in a biofilter-type aeration bed.
Figure 15:
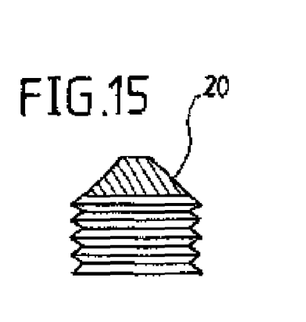
Figure 16:
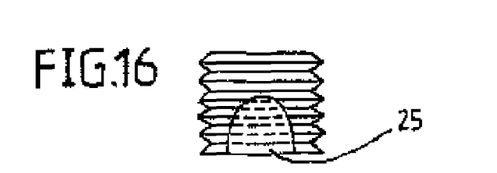

According to one particular embodiment of a special plug (20), as represented in FIGS. 12 and 13, the purpose of the latter is to effect the distribution of air under a biofilter, in which the materials are left in position for a long time. This biofilter is composed of an aeration bed (1) in possible contact with the biomass used for purification of the air, where the biomass can be in contact with the aeration bed (1) for distribution of the foul air or where the biomass can be in contact first with a plenum for homogenisation of the air, of the grating type with ballast for supporting the biomass on this same aeration bed. Special threaded plugs (20) are provided, in which the aeration hole (21) will be located above the concrete screed (18) constituting the aeration bed of the biofilter (1), but where the fines organic particles resulting from the breakdown of the biofilter (24) cannot be deposited and stagnate on the special plug (20).

The top part of the plug, as represented in FIG. 1, will be sloped, rounded or conical in shape (in all cases not horizontal or not incurved toward the centre of the pipette), thus avoiding the stagnation of the fine organic particles or of the sludges resulting from the breakdown process of the biomass, these particles or sludges (22) being in contact with the aeration hole (21) of the aeration pipette (5) fitted with the special biofilter plug (20).

According to a variant applicable to the creation of all these plug types, such as that presented in FIGS. 11 and 12, each threaded plug can be hollowed out in the lower part of the plugs (25), so as to reduce the thickness of the reamed plug as much as possible, and thus to improve the effectiveness of the system for expulsion of the fine particles and sludges that can clog the pipette when the fan is brought into operation.

The thickness of the reamed plug (25) should be at least three or even four millimeters so as not to be too fragile, and in order to cope with the passage of machines over the aeration bed (1).

Figure 17:
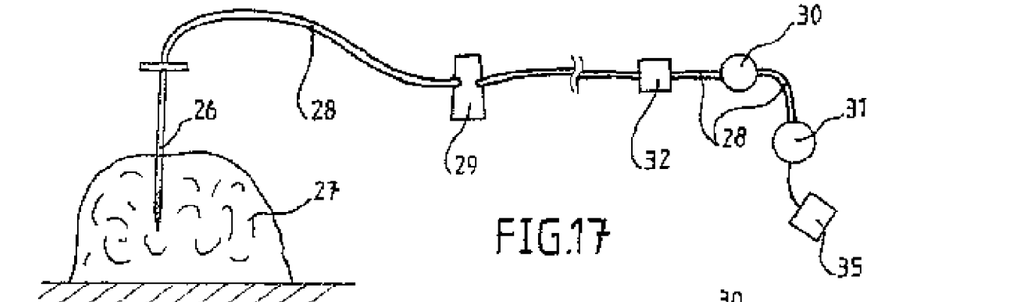
FIG. 17 presents the improvement related to gas measurement using the air sampling rod inserted into the heap, together with the gas sampling pipe, the filter added for trapping the particles and condensation products, and the solenoid valve for control and regulation of the gas intake.

Regarding sampling of the gases, for their analysis and for monitoring the composting or waste treatment processes, the installation as represented in FIG. 17 includes not only a gas sampling rod (26) for each compost heap (27), but also, on the pipe for sampling of the gas (28), an additional filter (29) for trapping the condensation products and the fines organic particles drawn in by the air pump (30) installed downstream of the probe or probes for measurement and analysis of the gas or gases (31), and of the solenoid valve (32) that controls the intake of the gases to be analysed.

The installation described above, and as represented in FIG. 18, includes a compressor (33) for purging the condensation products. The compressor (33) will be controlled by a solenoid valve (34) which is timed or in turn controlled by the automatic processor controlling the process (35), and separate from the solenoid valve (32) controlling the intake of the gases.

Figure 18:
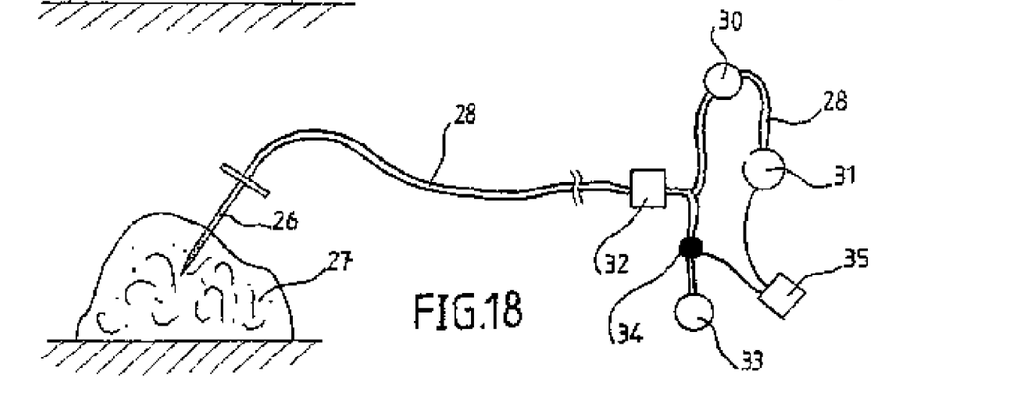
FIG. 18 presents the improvement in gas measurement, with the installation of a compressor to purge the condensation products, and its solenoid valve for automatic control of the said purge operation.

The compressor (33) will preferably be installed upstream of the air pump (30) and downstream of the solenoid valves (34) used to control the intake of the gases, in such a manner that it is also able to clean the latter because of the cleaning effect of the compressed air injected into the pipe used to sample the gases analysed (28).

It goes without saying that the installation, as represented in FIG. 18, can include both a compressor (33) and a filter (29) for the trapping of particles.

Figure 19:
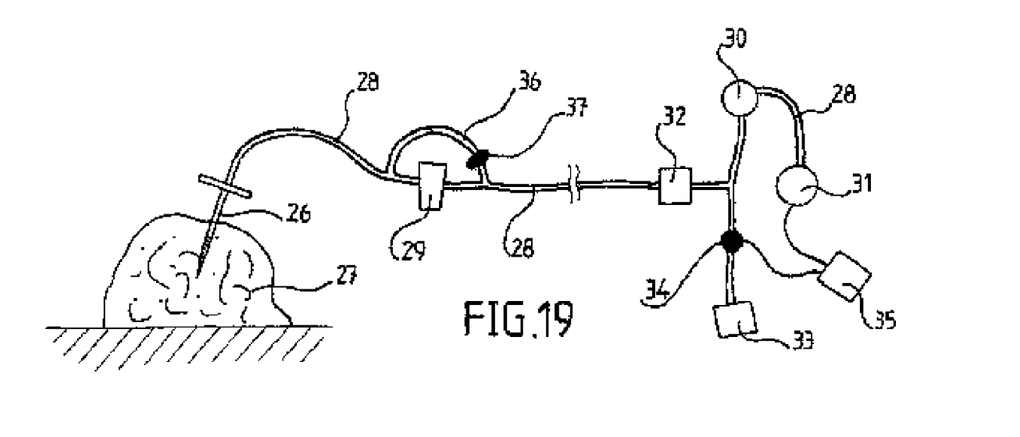
FIG. 19 presents a view in section of the device used to short-circuit the filter for trapping the particles and condensation products, while also allowing the escape of the air produced by the compressor. In this figure, the non-return valve is installed on the pipe added as a bypass, in order to prevent the air drawn in by the intake pump from passing via this added pipe so that the air drawn in by the pump would therefore not be fully processed by the filter.

In this context, the installation is then equipped with an additional pipe (36) used to short-circuit the filter (29) when the compressor (33) is operating. This pipe (36) is also equipped with a non-return valve (37), forcing the air drawn in by the pump (30) for sampling of gases to be analysed to pass via the filter for trapping of the condensation products (29).

Figure 20:
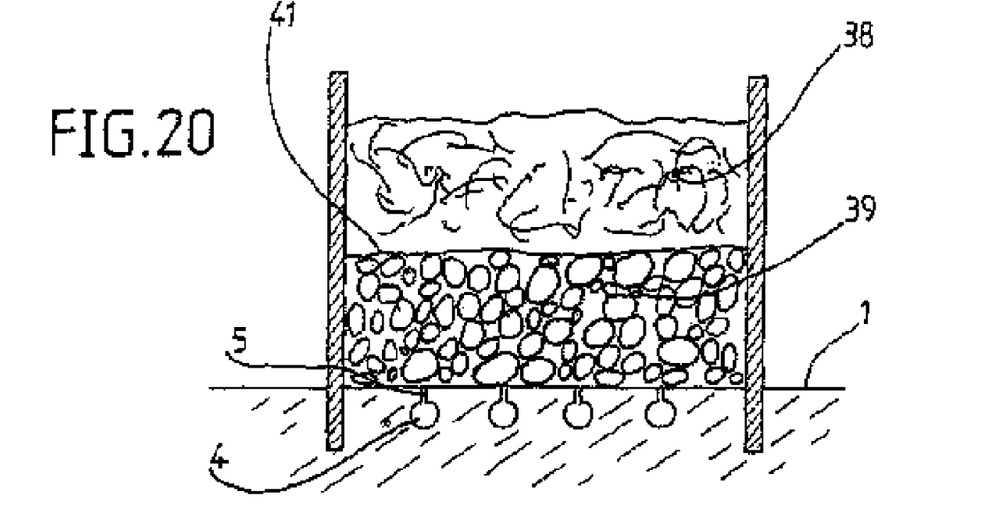
FIG. 20 presents a view in section of a biofilter in which the base is equipped with cobblestones which are used both as a support for the biomass and as a structure for the distribution of air under this biomass.

The composting installation can then also be equipped with biofilters (34), as presented in FIG. 20, composed in the lower part and acting as support for the biomass (38), made of cobblestone ballast (39).

Figure 21:
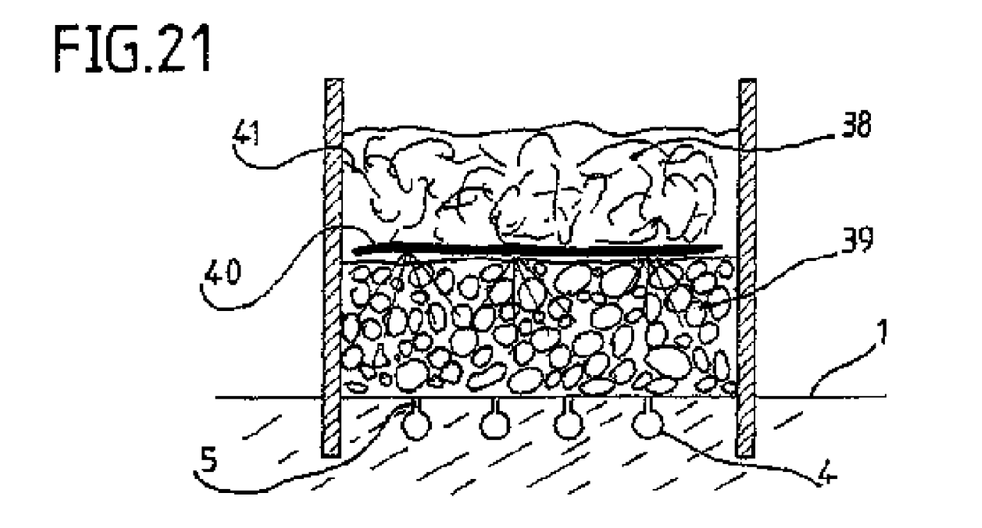
FIG. 21 presents a view in section of a biofilter equipped with cobblestones, and with a device for the distribution of liquids or cocktails of bacteria or enzymes, placed between the cobblestones and the biomass.

In a variant, the biofilter (34) can be equipped, between the cobblestone ballast (39) and the biomass (38), with a device for the distribution of acid or alkaline liquids (40), or of enzyme or bacteria cocktails.

It goes without saying that the liquid distribution device (37) can be placed directly between the cobblestone ballast (39) and the biomass (38) or even within the biomass or on the latter. The improved biofilter (34) will therefore have a purification function of the scrubbing tower type, in addition to its biofilter function.

The device for the distribution of the liquid or liquids (40) or of the cocktails of enzymes or bacteria, can be of the sprinkler-bar type, though not exclusively so. It goes without saying that all these innovations can be used individually or in combination in the composting processes or for the elimination of pollution and the treatment of waste.

What is claimed is:

1. A device for biofiltration, purification and treatment of air comprising:
    an aeration bed for the distribution of air and for collection of the process liquids (1) on which is placed-a cellular structure resting-directly on the aeration bed, characterized in that the cellular structure comprises stones of generally rounded shape; and a biomass disposed on the cellular structure.

2. A device according to claim 1, characterized in that the cellular structure comprises-cobblestones resting directly on the aeration bed.

3. A device according to claim 2, further comprising one or more devices for the distribution of liquids.

4. A device according to claim 3, wherein the one or more devices for distribution of liquids are located on the biomass and/or in the biomass and/or between the biomass and the cellular structure.

5. A device according to claim 4, wherein the liquids are selected from the group consisting of an acidic liquid, a basic liquid, a liquid comprising at least one enzyme, and a liquid comprising at least one bacteria.

6. A device according to claim 4, wherein the one or more devices for distribution of liquids is a sprinkler bar.

7. A device according to claim 3, further comprising a liquid disposed in the cellular structure.

8. A device according to claim 3, wherein the liquids are acidic.

9. A process for biofiltration of foul air produced in a composting process, comprising:
- causing the air to contact the cellular structure of a device according to claim 4, wherein the cellular structure acts as a scrubbing tower.

10. A process according to claim 9, comprising:
- dispensing one or more liquids from a device for distribution of liquids.

* * * * *